Aug. 13, 1957     L. J. YOST     2,802,302

POLLINATOR FOR FRUIT TREES

Filed Sept. 23, 1955

INVENTOR,
LELAND J. YOST
BY
*Lyon & Lyon*
ATTORNEYS

United States Patent Office 2,802,302
Patented Aug. 13, 1957

2,802,302
POLLINATOR FOR FRUIT TREES

Leland J. Yost, Thermal, Calif., assignor to Forrest B. Whisler, Coachella, Calif.

Application September 23, 1955, Serial No. 536,148

3 Claims. (Cl. 47—1)

This invention relates to apparatus for pollinating fruit trees and will be described in connection with a pollinator for date palms, although it is not restricted to such use.

Pollination of date palm trees is ordinarily accomplished through the use of tall ladders. A man with a small jar of pollen climbs the ladder and deposits pollen on the blossoms of the tree. Since the trees are large and tall, the man may have to reset the ladder a number of times for a single tree in order to reach each of the groups of blossoms. This entails considerable amount of time and labor.

In accordance with my invention, I provide a device which may be used by a worker standing on the ground, thereby eliminating the need for climbing ladders. I provide a relatively long, light-weight, hollow pole which carries a bracket on its upper end and a small jar of pollen is supported by the bracket. The lower end of the pole may rest in a belt socket worn by the worker. A rubber blow tube connects with the lower portion of the pole and a similar tube connects the pollen jar with the upper end of the pole. The hollow pole is closed at both ends. The worker takes the blow tube in his mouth and delivers a short, quick puff of air into the tube. The chamber within the interior of the hollow pole is pressurized slightly by this puff and a corresponding jet of air is directed into the pollen jar through the other tube. An equivalent amount of air is caused to pass out of a discharge tube connected to the pollen jar, carrying pollen with it.

Figure 1:
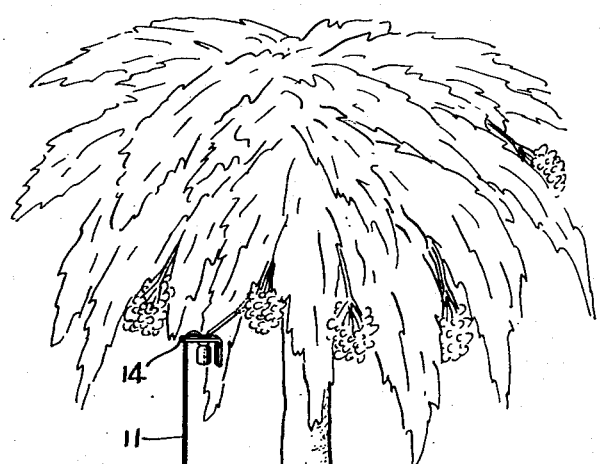
Figure 1 is a diagrammatical sketch of a worker using a device embodying my invention.
Figure 2:
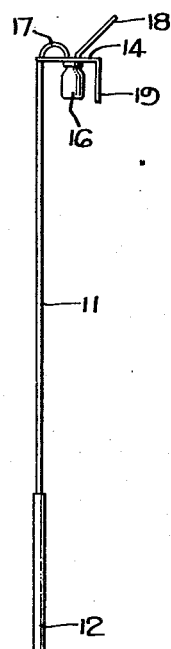
Figure 2 is a side elevation showing a preferred embodiment of my invention.
Figure 3:
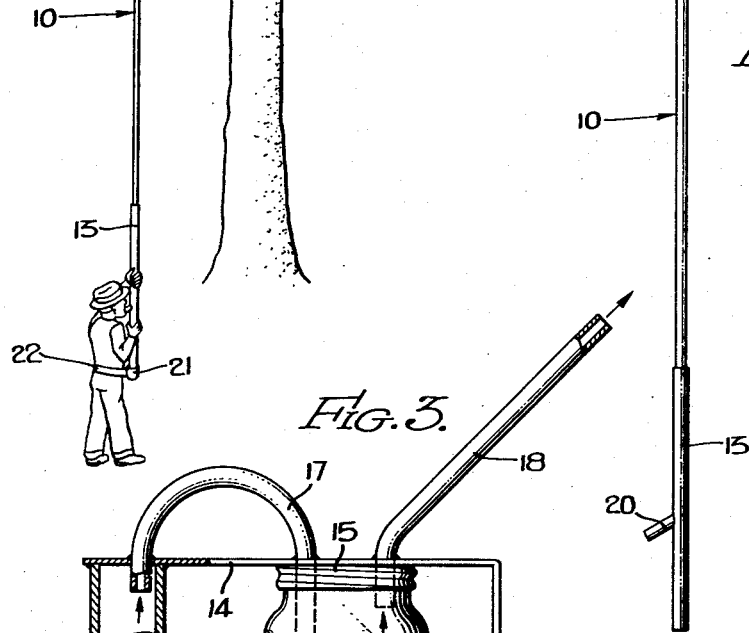
Figure 3 is a side elevation of the pollen jar and associated parts shown on an enlarged scale.

Referring to the drawings:

The pole, generally designated 10, may be formed of aluminum tubing and may have a total length of from 25 to 30 feet. The pole may be of the same size throughout but I prefer to employ a small diameter upper section 11, a larger diameter center section 12, and a still larger diameter lower section 13. The sections may be welded together or joined by any suitable fastenings. The upper end of the section 11 is closed and the lower end of the section 13 is closed. The sections communicate to form a single chamber. As best shown in Figure 3 the upper section 11 of the pole 10 is provided with a bracket 14 having a jar lid 15 fixed thereto. A container or jar 16 containing pollen may be threaded into engagement with this lid. A tube 17 connects the interior of the pole section 11 with the lower portion of the interior of the pollen jar 16. A pollen delivery tube 18 connects with the upper portion of the pollen jar 16 and extends outward at an angle. Both ends of the tube 17 and 18 are open and both are carried on the bracket 14. If desired, a shield 19 may be mounted on the bracket 14 to protect the pollen jar 16 against breakage.

The lower section 13 of the hollow pole 10 is provided with a blow tube 20 which communicates with the interior of the section 13. This tube 20 may conveniently be formed of rubber and of a size to be received between the lips of the worker. The lower end of the section 13 may conveniently be received within the socket 21 provided on a belt 22 worn by the worker.

In operation, the worker rests the weight of the pole 10 in the belt socket 21 and manipulates the pole with his hands to place the delivery tube 18 at the proper location with respect to a group of blossoms in the tree. The worker manipulates the pole 10 and steadies it by placing one hand above the blow tube 20 and the other hand below it, as shown in Figure 1. He then delivers a short, quick puff of air into the blow tube 20. The resulting pressure rise within the rather large chamber within the hollow pole 10 causes a corresponding jet of air to be delivered through the tube 17 into the lower portion of the pollen jar 16. This in turn causes pollen to be carried in a jet of air issuing from the delivery tube 18. The amount of pollen delivered depends upon the quantity and velocity of air delivered by the worker through the blow tube.

Having fully described my invention it is to be understood that I do not wish to be limited to the details herein set forth but my invention is of the full scope of the appended claims.

I claim:

1. In a device for pollinating fruit trees and the like, the combination of: a long vertical hollow pole closed at both ends, a bracket fixed upon the upper end of the pole, means on the bracket for detachably mounting a pollen container, a tube fixed to the bracket establishing communication between the interior of the hollow pole and the interior of the container, a pollen delivery tube on the bracket communicating with the interior of the container, and a blow tube connected to the interior of the pole near the lower end thereof and having a portion adapted to be received between the lips of a worker to receive a puff of air, whereby the worker may use both hands, one above and one below the blow tube to manipulate the pole.

2. In a device for pollinating fruit trees and the like, the combination of: a vertical hollow pole closed at both ends, means including a bracket at the upper end of the pole for detachably mounting a pollen container, a tube fixed to the bracket establishing communication between the interior of the hollow pole and the lower interior portion of the container, an inclined pollen delivery tube communicating with the interior of the container, and a blow tube connected to the interior of the pole near the lower end thereof and having a portion adapted to be received between the lips of a worker to receive a puff of air, whereby the worker may use both hands, one above and one below the blow tube to manipulate the pole.

3. In a device for pollinating fruit trees and the like, the combination of: a vertical hollow pole closed at both ends, the pole having a relatively small diameter upper portion and a relatively large diameter lower portion, means including a bracket on the upper portion of the pole for detachably mounting a pollen container, a tube fixed to the bracket establishing communication between the interior of the hollow pole and the interior of the container, a pollen delivery tube communicating with the interior of the container, and a blow tube connected to the interior of said lower portion of the pole and having a portion adapted to be received between the lips of a worker to receive a puff of air, whereby the worker may use both hands, one above and one below the blow tube to manipulate the pole.

References Cited in the file of this patent
UNITED STATES PATENTS

| | | |
|---|---|---|
| 44,341 | Reynard | Sept. 20, 1864 |
| 2,548,487 | Marchant | Apr. 10, 1951 |